(12) United States Patent
Ren et al.

(10) Patent No.: US 9,619,173 B1
(45) Date of Patent: Apr. 11, 2017

(54) UPDATING SYNCHRONIZATION PROGRESS

(71) Applicant: EMC Corporation, Hopkinton, MA (US)

(72) Inventors: Ren Ren, Shanghai (CN); Oliver (DS SH) Yang, Shanghai (CN); Xi Ma, Shanghai (CN); Walter Wang, Shanghai (CN); Shay Harel, Marlborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 14/493,616

(22) Filed: Sep. 23, 2014

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ............. G06F 11/1482; G06F 11/3409; G06F 11/1407; G06F 11/1438; G06F 11/1479; G06F 11/1484; G06F 11/2097; G06F 12/0804; G06F 2201/81; G06F 9/5061; G06F 3/065; G06F 3/067; G06F 3/0619
See application file for complete search history.

(56) References Cited

U.S. PATENT DOCUMENTS

| | | | | |
|---|---|---|---|---|
| 7,870,093 B2* | 1/2011 | Eguchi | ................ | G06F 11/1471 707/609 |
| 2007/0183224 A1* | 8/2007 | Erofeev | ............. | G06F 11/1456 365/189.05 |
| 2011/0082835 A1* | 4/2011 | Agrawal | ........... | G06F 17/30194 707/646 |
| 2012/0222034 A1* | 8/2012 | Ishikawa | ............. | G06F 11/1438 718/102 |
| 2013/0067277 A1* | 3/2013 | Mummidi | ........... | G06F 11/2097 714/19 |

* cited by examiner

*Primary Examiner* — Zhou Li
(74) *Attorney, Agent, or Firm* — Muirhead and Saturnelli, LLC

(57) ABSTRACT

Described are techniques for updating checkpoint data during a copy process that copies data from a first device to a second device. A portion of data is copied from the first device to the second device. A first calculated value is determined in accordance with a plurality of factors. In accordance with the first calculated value and a threshold ratio, it is determined whether to update the checkpoint data denoting progress of the copying process that copies data from the first device to the second device. If it is determined to update the checkpoint data, first processing is performed that updates the checkpoint data.

19 Claims, 11 Drawing Sheets

UPDATING SYNCHRONIZATION PROGRESS

BACKGROUND

Technical Field

This application generally relates to data storage and, more particularly, to updating synchronization or data copying progress.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of updating checkpoint data during a copy process that copies data from a first device to a second device, the method comprising: copying a portion of data from the first device to the second device; determining a first calculated value in accordance with a plurality of factors; determining, in accordance with the first calculated value and a threshold ratio, whether to update the checkpoint data denoting progress of the copying process that copies data from the first device to the second device; and if it is determined to update the checkpoint data, performing first processing that updates the checkpoint data. The plurality of factors may include non-recorded synchronization progress indicating an amount of data that has been copied from the first device to the second device since checkpoint data was last recorded. The plurality of factors may include an average amount of time delay between consecutive synchronization I/O operations performed each of which copy a different data portion of the first device to the second device. The plurality of factors may include an average measured amount of time to complete a single synchronization I/O operation that copies a portion of data from the first device to the second device. The plurality of factors may include a number of concurrent data synchronizations currently being performed. The average amount of time delay between consecutive synchronization I/O operations may be configured and may denote an average rate at which processing is performed to copy data from the first device to the second device thereby affecting the rate at which synchronization I/Os are issued to copy data from the first device to the second device. The average amount of time delay may be configured via a user input from a user interface. The step of determining, in accordance with the first calculated value and a threshold ratio, whether to update checkpoint data denoting progress of copying data from the first device to the second device, may include comparing the first calculated value to the threshold ratio; and determining, responsive to said comparing, whether the first calculated value exceeds the threshold ratio. It may be determined to update the checkpoint data and perform said first processing responsive to determining that the first calculated value exceeds the threshold ratio. The first processing may include recording information in persistent memory, said information denoting a location on the first device whereby all data of the first device data up to the location has been copied to the second device. The method may include copying a plurality of data portions of the first device to the second device, wherein the plurality of data portions are stored at logical addresses of the first device that are sequentially ordered, and wherein the plurality of data portions may be copied sequentially in accordance with the sequential ordering of the logical addresses. The first device and the second device may be logical devices. The first device may be an original set of data and the second device may be a clone of the first device. The method may be performed to synchronize the second device with the first device. The second device may be an original set of data and the first device may be a clone of the first device and the method may be performed to resynchronize the second device with the first device. The plurality of factors may include non-recorded synchronization progress indicating an amount of data that has been copied from the first device to the second device since checkpoint data was last recorded, an average amount of time delay between consecutive synchronization I/O operations performed each of which copy a different data portion of the first device to the second device, an average measured amount of time to complete a single synchronization I/O operation that copies a portion of data from the first device to the second device, and a number of concurrent data synchronizations currently being performed. The the first calculated value, Rcalc, may be expressed as:

$$Rcalc = \frac{NRSP}{\left(\frac{1}{IOI + AIOR}\right) * \left(1 + \frac{CSC}{MXCSC}\right)}$$

where NRSP is said non-recorded synchronization progress; IOI is said average amount of time delay between consecutive synchronization I/O operations; AIOR is said average measured amount of time to complete a single synchronization I/O operation; CSC is said number of concurrent data synchronizations currently being performed; and MXCSC is an integer constant denoting a maximum number of allowable concurrent synchronization. The method may include comparing the first calculated value to the threshold ratio;

and determining, responsive to said comparing, whether the first calculated value exceeds the threshold ratio.

In accordance with another aspect of the invention is a non-transitory computer readable medium comprising code stored thereon that, when executed, performs a method of updating checkpoint data during a copy process that copies data from a first device to a second device, the method comprising: copying a portion of data from the first device to the second device; determining a first calculated value in accordance with a plurality of factors; determining, in accordance with the first calculated value and a threshold ratio, whether to update the checkpoint data denoting progress of the copying process that copies data from the first device to the second device; and if it is determined to update the checkpoint data, performing first processing that updates the checkpoint data.

In accordance with another aspect of the invention is a system comprising: a processor; and a memory comprising code stored thereon that, when executed, performs a method of copying data from a first device to a second device comprising: copying a portion of data from the first device to the second device; determining a first calculated value in accordance with a plurality of factors; determining, in accordance with the first calculated value and a threshold ratio, whether to update the checkpoint data denoting progress of the copying process that copies data from the first device to the second device; and if it is determined to update the checkpoint data, performing first processing that updates the checkpoint data.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
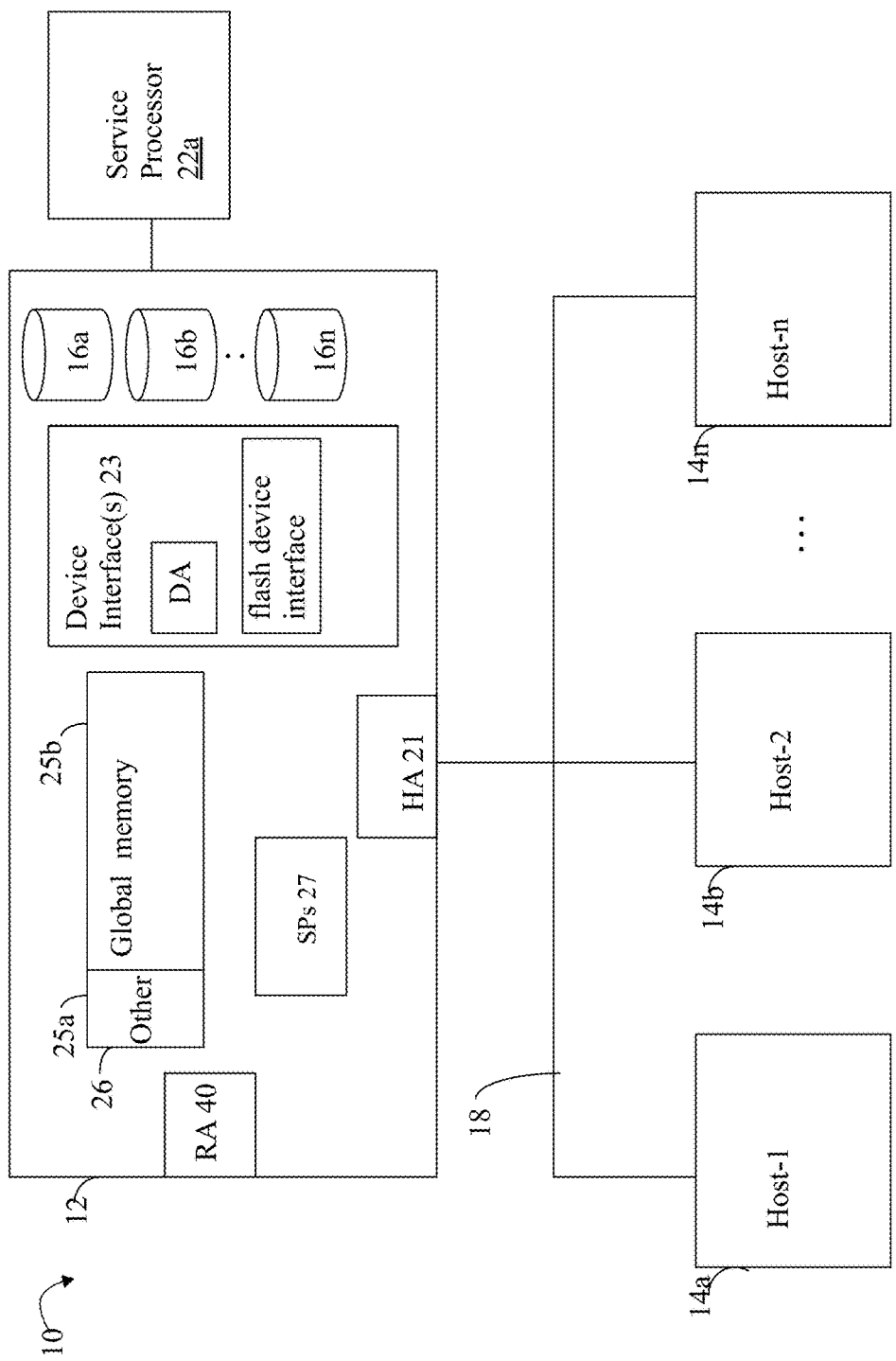
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
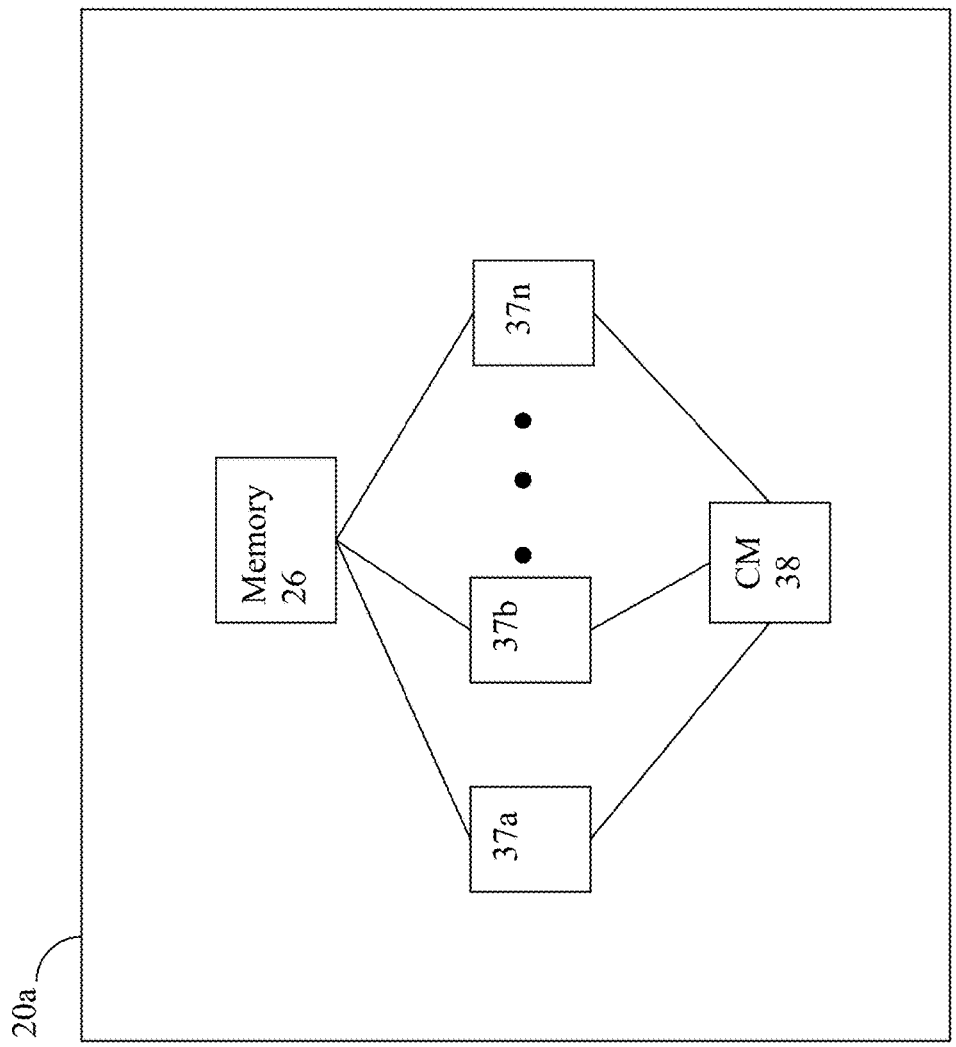
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

A data storage system may perform processing for different data services. For example, a data storage system, such as the VNX® data storage system by EMC Corporation, may perform data services such as data backup, migration, and the like. One such data service may be clones created using EMC® SnapView™ in which a physical bit for bit copy of a LUN is made that is a complete physical copy or replicate of the LUN. A clone created using the SnapView™ product is an example of one type of service that provides for creating a full physical copy (e.g., bit for bit replica) of a source LUN where the copy may be a local copy of the source LUN within the data storage system.

Creating the clone or physical copy of a source LUN includes processing to copy data of the source LUN to a destination or target LUN whereby the destination LUN is synchronized or in a consistent state with respect to the source LUN. Thus, synchronization may refer to the operation performed when creating the clone whereby the data is copied from the source LUN to the destination LUN it its clone. Reverse synchronization may refer to the operation performed where data is copied from the destination LUN or clone to the source LUN (e.g., such as to restore the source LUN to its state or point in time as in the destination LUN).

Figure 3:
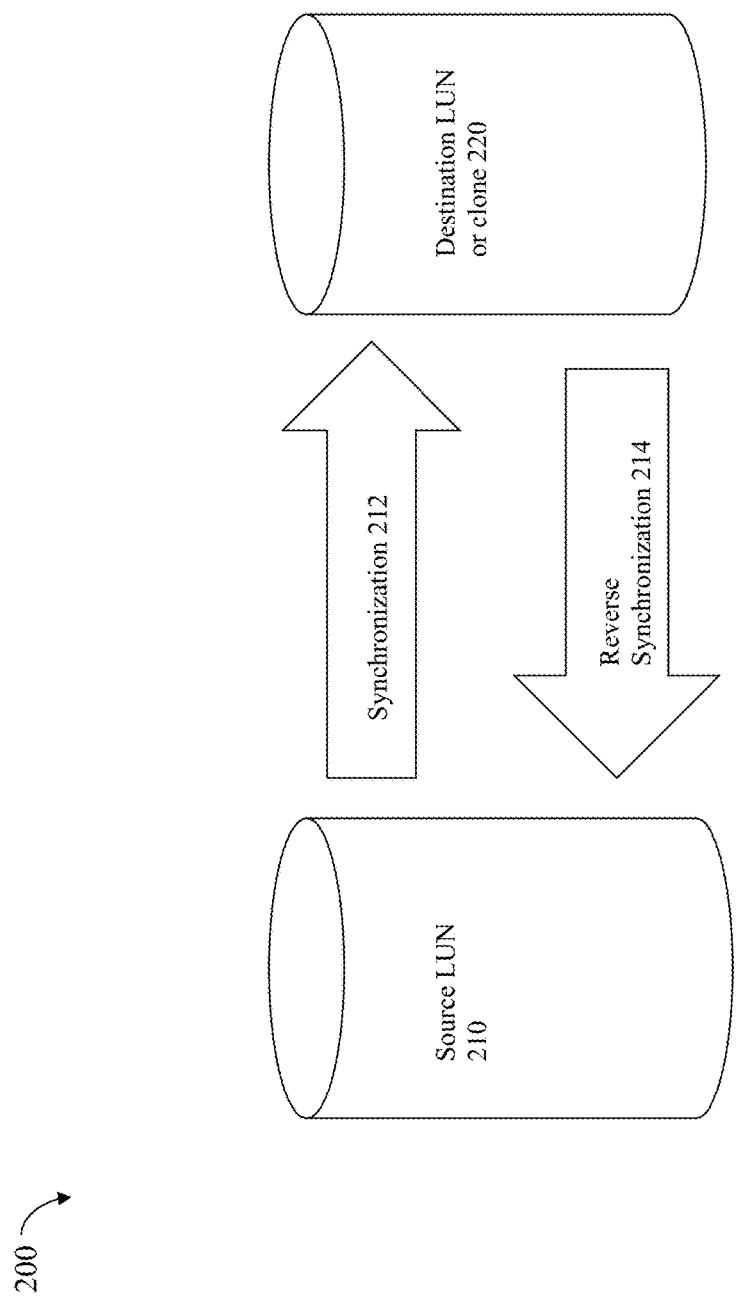
FIG. 3 is an example illustrating synchronization and reverse synchronization between a source logical device and its clone or destination logical device.

Referring to FIG. 3, shown is an example illustrating processing that may be performed in an embodiment in accordance with techniques herein. The example 200 illustrates processing as just described. In connection with creating the destination LUN 220 as a clone of the source LUN 210, synchronization 212 is performed whereby data is copied from source LUN 210 to the clone or destination LUN 220. Reverse synchronization 214 may also be performed at a later point in time whereby data is copied from the clone or destination LUN 220 to the source LUN 210.

A full synchronization is the initial synchronization between the source LUN 210 and the clone or destination LUN 220 where all the data on the source LUN 210 is copied. Such copying may be performed sequentially whereby data is copied in an order from the beginning offset or LBA (logical block address) of the source LUN 210 to the ending offset or LBA of the source LUN 210.

During the data copying process performed as part of the full synchronization to create the clone or physical copy of the source LUN, processing may also be performed to record the progress of the synchronization (e.g., how far along in the data copying process) which is referred to as a check point. Thus, during the synchronization as well as resynchronization process to copy data, there may be multiple checkpoints each having associated checkpoint data that is recorded. In one embodiment, checkpoint data regarding the latest or most recent checkpoint may be retained during the synchronization or resynchronization process. Generally, the checkpoint data characterizes the current state of the copying at the time of the checkpoint. Checkpoint data recorded may include recording information that identifies the last location (e.g., LBA) on the source LUN having its data copied to the clone or destination LUN. Thus the checkpoint data may include a source LUN offset or LBA denoting the location on the source LUN before which all source LUN data has been copied to the clone or destination LUN 220.

Checkpoint data may be stored to persistent memory (PSM) for use subsequent to an event occurrence, such as a system failure, reboot, and the like, where the event occurrence causes the data copying or synchronization to cease before completion. Subsequent to such an event occurring, the copying process copying data form the source LUN to its clone may be restarted and read the latest checkpoint data recorded prior to the event. The copying process may resume its copying from the last or most recent checkpoint rather than, for example, restarting the entire copying operation from the beginning LBA of the source LUN.

Figure 4:
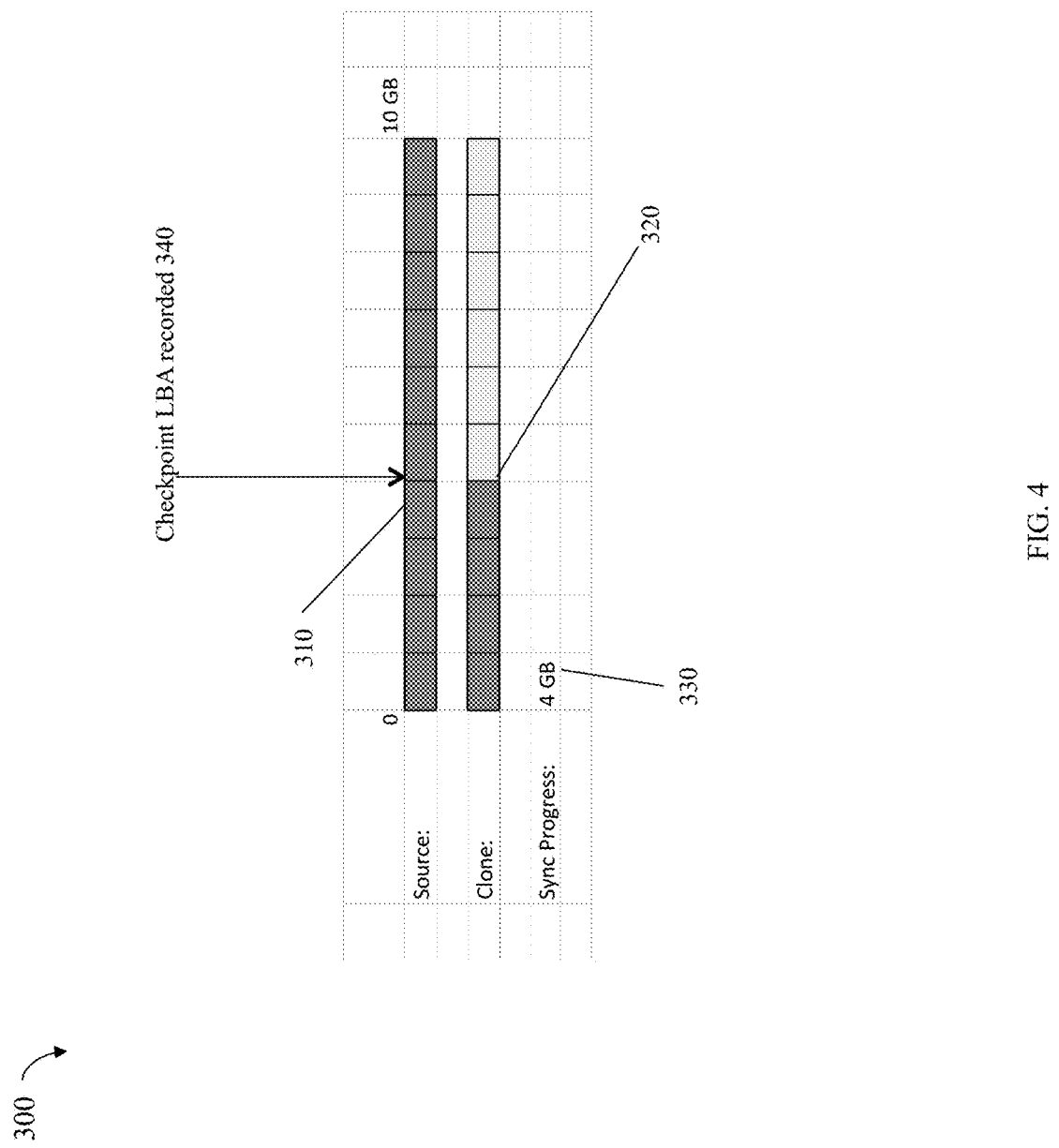
FIG. 4 is an example illustrating synchronization progress and an associated checkpoint with checkpoint data recorded in an embodiment in accordance with techniques herein.

Referring to FIG. 4, shown is an example 300 illustrating, at a point in time, how much data has been copied in an embodiment in accordance with techniques herein. Element 310 may graphically represent that the source LUN (e.g. such as source LUN 210 of FIG. 3) has 10 GB of data which needs to be copied to the destination LUN or clone (e.g., such as destination LUN or clone 220 of FIG. 3). Element 320 may represent the state of data on the clone or destination LUN that at the point in time 4 GB of data has been copied from the source LUN to the clone or destination LUN. Element 330 may denote the synchronization or data copying progress of 4 GB. If a checkpoint is created for the foregoing illustrated point in time of the example 300, the checkpoint data recorded generally includes metadata needed for the synchronization or copying process to resume from the recorded checkpoint upon the occurrence of a system failure or other event causing the copying to stop prior to completion. For example, the checkpoint data recorded may include information describing the current state of the copying progress such as the LBA location on the source LUN denoting the point up to which all data has been copied to the clone. Element 340, checkpoint LBA recorded, denotes the corresponding source LUN LBA recorded for the checkpoint thereby identifying the source LUN LBA location of the 4 GBs of data that has been copied to the destination LUN or clone. Upon the occurrence of an event causing the data copying to stop, the data copying process may be restarted which reads the last set of checkpoint data saved and then resumes the data copying from the source LUN LBA location of the last checkpoint.

However, storing the checkpoint data may be resource consuming. For example, the PSM may be a shared resource used by many processes and components of the storage system. Thus, there may be contention for the PSM between a process that records the checkpoint data and other processing performed in the data storage system. Since the PSM is a shared resource, overhead may be incurred in connection with locking or other synchronization techniques used to synchronize access to the PSM, or portions thereof. Additionally, there may be multiple full synchronization operations going on concurrently to create multiple clones of multiple different source LUNs. Thus, sets of checkpoint data need to be recorded to the PSM for each such synchronization between a source LUN and a clone or destination LUN further increasing the contention for the PSM and further increasing the amount of system resources needed just to record the progress of each data copying synchronization.

Since storing of the check point data may be resource consuming, if it is performed too frequently, the entire performance of the data system may be adversely affected. However, if the time interval between two consecutive checkpoints is too large, upon the occurrence of a system failure, reboot or other event that causes the data copying process to stop before completion, the data copying process may resume at a point whereby a large amount of source LUN data is recopied to the clone or destination LUN. As such, it may be desirable to select an appropriate time interval at which different checkpoints are made and the associated checkpoint data recorded regarding the synchronization progress.

Described in following paragraphs are techniques that may be used in connection with deciding when to create a checkpoint and record checkpoint data (e.g., when to record the progress of the synchronization or data copying operation). Techniques described in following paragraphs make such a decision regarding when to create a checkpoint and record checkpoint data based on one or more criteria. The criteria may include several factors used to decide how frequently checkpointing is performed (e.g., frequency at which checkpoints are created) and thus how frequently associated checkpoint data is accordingly stored. Such techniques described herein may be characterized as dynamic and adaptive in connection with determining when to create a checkpoint and thereby record the progress of the synchronization or data copying. In following paragraphs, a synchronization I/O may refer to the processing performed to read a data portion from the source LUN and then write that data portion to the clone or destination LUN.

Techniques herein may use criteria including a first factor referred to as Non-Recorded Sync (Synchronization) Progress (NRSP). NRSP may be defined as the current synchronized progress as measured since the last or most recent check point. NRSP may identify an amount of data, such as in GB units, that has been copied to the destination LUN or clone since the last checkpoint was created and thus since the last set of checkpoint data was recorded in PSM. It should be noted that the larger the NSRP is, the stronger the need to create a new checkpoint and record the next set of checkpoint data. If NRSP is large, it means that a large amount of data has been copied to the clone or synchronized since the last check point. The NSRP may be delta or difference in GBs denoting the amount of data copied since the last checkpoint was created or since the last checkpoint data was recorded in PSM. Thus, NRSP is a measured or observed value.

Techniques herein may use criteria including a second factor referred to as I/O Interval (IOI). IOI may be defined as the average synchronization rate or average time delay between two consecutive synchronization I/Os performed to copy the data from the source LUN to the destination LUN or clone. Thus, the IOI affects the rate at which data synchronization or copying occurs between the source LUN and destination LUN or clone (e.g., affects the rate at which processing issues synchronization I/Os to perform the synchronization or copying of data from source LUN to its clone). In one embodiment, a user may set and/or change the IOI such as using a graphical user interface (GUI) option or setting. In such an embodiment the user may modify the IOI during the synchronization once it has commenced (e.g. IOI may be changed during the synchronization or data copying process). IOI may be expressed in seconds or any other suitable units of time. Thus, IOI is an input or setting rather than a measured value.

In one embodiment as noted above, a GUI may provide selectable options whereby the user may set the IOI. Generally, a user may be allowed to configure the IOI to a value between 0 and 0.1 seconds. For example, a user may be provided with a menu from which they can select LOW, MEDIUM or HIGH whereby each of the foregoing denote different IOIs. If LOW is selected, IOI may be set to 0.1 seconds. If MEDIUM is selected, IOI may be set to 0.003 seconds. If HIGH is selected, IOI may be set to 0.0003 seconds.

Techniques herein may use criteria including a third factor referred to herein as average synchronization I/O response time (AIOR). AIOR may be defined as the average measured amount of time it takes for a single synchronization I/O to complete (e.g., time from when the synchronization I/O is initiated to when the synchronization I/O completes). A single synchronization I/O includes a read, to read a data portion from the source LUN, and a write, to write the data portion to the clone or destination LUN. In this manner, AIOI may represent the measured or observed average amount of time it takes to complete a single synchronization I/O including both the foregoing read and write. AIOR may be expressed in seconds or any other suitable units of time and is a measured value. AIOR may be updated, for example, each time a synchronization I/O completes, after a specified number of synchronization I/Os complete, and the like. As an example, the measured AIOR may be a value in the range of 0.001 seconds to 0.1 seconds Techniques herein may use criteria including a fourth factor referred to as concurrent synchronization count (CSC). CSC may be defined as the number of concurrent data synchronizations being performed in the system. In other words, CSC represents how many clones are currently in the process of being synchronized or created (e.g., number of clones for which not all data has yet been copied from the corresponding source LUN/has full synchronization currently in progress). The larger the CSC, the greater the need to decrease the frequency at which new check points are created for each clone being created since the number of concurrently performed checkpoints affects the system performance. CSC may be an integer that is equal to or greater than zero. An embodiment may allow up to a specified maximum number of concurrent clone data synchronizations at any point in time. For example, one embodiment may have a maximum of 40 thereby denoting that CSC may never have a value greater than 40.

Figure 5:
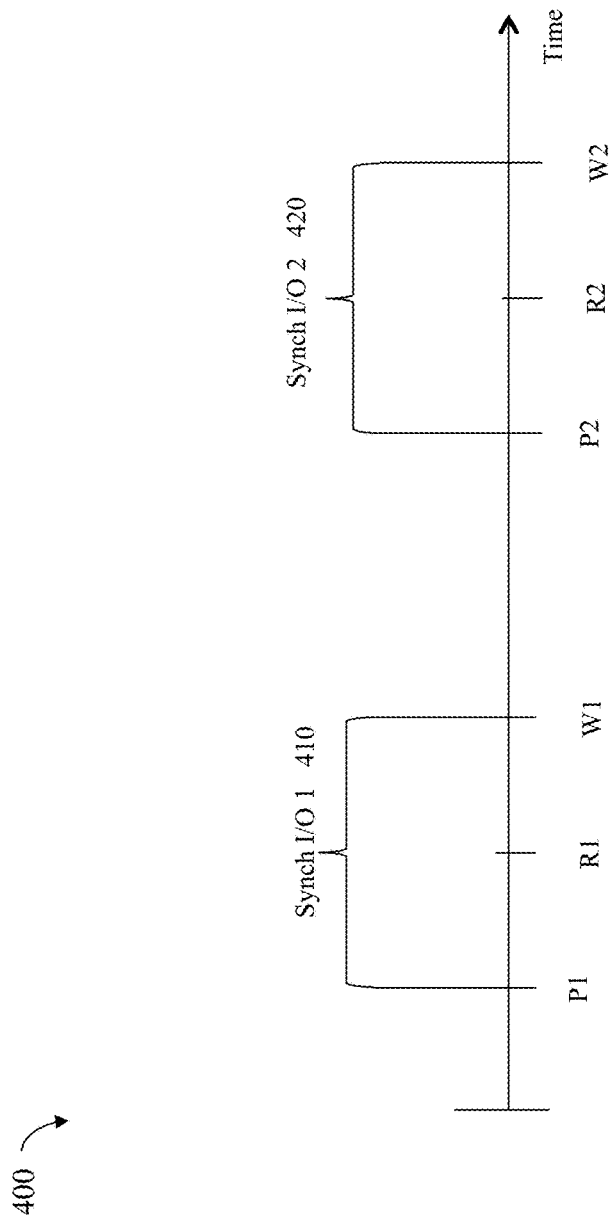
FIG. 5 is an example illustrating points in time in connection with synchronization I/Os performed in an embodiment in accordance with techniques herein.

Referring to FIG. 5, shown is an example illustrating synchronization I/Os that may be issued in an embodiment in accordance with techniques herein in connection with synchronizing a source LUN and its clone (e.g., copying data from the source LUN to its clone). The example 400 illustrates two consecutively issued synch (synchronization) I/Os 410 and 420. P1 may denote a first point in time at which the first synchronization I/O 1 410 is initiated. The synchronization I/O operation 410 may include a first read operation to read a first data portion from the source LUN and a first write operation to write the first data portion to its clone. R1 may denote the point in time at which the first data portion has been read from the source LUN and W1 may denote the point in time at which the first write operation has completed writing the first data portion to the clone. Thus, the amount of time taken to complete the first sync I/O 410 may be represented as the amount of time between P1 and W1.

The synchronization I/O operation 420 may include a second read operation to read a second data portion from the source LUN and a second write operation to write the second data portion to its clone. R2 may denote the point in time at which the second data portion has been read from the source LUN and W2 may denote the point in time at which the second write operation has completed writing the second data portion to the clone. Thus, the amount of time taken to complete the second sync I/O 420 may be represented as the amount of time between P2 and W2. Thus, generally, Pi, i>0, may denote the point in time at which synchronization I/Oi commences and Wi may denote the point in time at which synchronization I/Oi completes.

The amount of time between the two consecutive synchronization I/Os (with respect to when both synchronization I/O commence or are initiated) may be represented as the time interval between P1 and P2, or more generally between Pi and Pi+1. The above-mentioned IOI factor or I/O synchronization rate may be the average amount of time between Pi and Pi+1 for two consecutive synchronization I/Os. Thus, the particular setting of the IOI affects the average time distance or interval between issuing two consecutive synchronization I/Os (e.g., the amount of time allowed to elapse between issuing a synchronization I/O at time Pi and the next synchronization I/O at time Pi+1). It should be noted that alternatively, an embodiment may also use an IOI value affecting the average amount of time from when ith synchronization I/O ends and when the i+1th synchronization I/O commences (e.g., average measured as average time between Wi and Pi+1. In such an embodiment, the time at which the i+1th synchronization I/O commences may depend on when the ith synchronization I/O completes (e.g., Wi) rather than when the ith synchronization I/O was issued or initiated at Pi.

Also the above-mentioned AIOR may be the average amount of time as measured or observed between Pi and Wi.

An embodiment may combine the above-mentioned factors into an equation or formula used to determine when to create a new checkpoint and thus record synchronization progress by recording the associated checkpoint data to PSM.

In one embodiment the following EQUATION 1 may be used to determine when to create a new checkpoint and thus record synchronization progress by recording the associated checkpoint data to PSM:

$$Rcalc = \frac{NRSP}{\left(\frac{1}{IOI + AIOR}\right) * \left(1 + \frac{CSC}{MXCSC}\right)}$$

where
Rcalc is the calculated ratio;
NRSP, IOI, AIOR and CSC are as described above; and
MXCSC is an integer constant denoting the maximum number of allowable concurrent synchronization (e.g., the maximum possible value for CSC such as described elsewhere herein);

The above Rcalc determined using EQUATION 1 may be compared to a threshold ratio GR. If Rcalc exceeds GR, then a new checkpoint is created and processing is performed that records the updated checkpoint data on PSM. GR may be chosen as any suitable threshold ratio in accordance with other acceptable values associated with those on the LHS of EQUATION 1. In one embodiment where MXCSC is 40 and IOI and AIOR may have typical values as described elsewhere herein, GR may be −0.618. Thus, at a point in time, if the calculated value for Rcalc exceeds 0.618, a new checkpoint is created where the most current set of checkpoint data stored on PSM is updated in accordance with the current synchronization progress for the point in time. Responsive to Rcalc exceeding GR, checkpoint data is copied to the PSM for the current synchronization progress where the checkpoint data includes the current LBA of the source LUN denoting the current synchronization point (e.g., data up to the current LBA has been copied from the source LUN to its clone or destination LUN).

To further illustrate, consider a first example EXAMPLE 1 where MXCSC is 40, the IOI is set to MEDIUM thereby having a value of 0.003 seconds, and GR is 0.618. Also assume the currently measured AIOR is 0.002 seconds and that there are 40 concurrent synchronization instances (e.g., CSC=40). In this case, if NRSP is larger than 247 MB, RCalc will exceed GR and whereby responsive to NRSP exceeding 247 MB, processing is performed to create a new check point and update the latest checkpoint data stored on PSM.

Now also consider a second example EXAMPLE 2 where MXCSC is 40, the IOI is set to HIGH thereby having a value of 0.0003 seconds, and GR is 0.618. Also assume the currently measured AIOR is 0.002 seconds and that there are 40 concurrent synchronization instances (e.g., CSC=40). In this case, if NRSP is larger than 537 MB, RCalc will exceed GR and whereby responsive to NRSP exceeding 537 MB, processing is performed to create a new check point and update the latest checkpoint data stored on PSM.

It should be noted that when each synchronization I/O completes, an embodiment in accordance with techniques herein may determine Rcalc, such as using EQUATION 1, and compare Rcalc to GR to determine if updating of the most recent check point data is necessary. If the updating of the check point is performed, processing then clears NRSP to 0. Additionally, after each sync IO completes, processing may be performed to determine the amount of time it has taken to complete this synchronization I/O and then also update average such time denoted by AIOI.

Such techniques described herein combine several factors as noted above. When each synchronization I/O completes, processing is performed to determine whether it is time to update the most recently recorded checkpoint data. Although the IOI and AIOR may change dynamically, techniques herein perform an evaluation of whether to record updated checkpoint data based on IOI and AIOR. Additionally, techniques herein consider CSC and reduce the frequency of updating checkpoint data as CSC increases.

Figure 6:
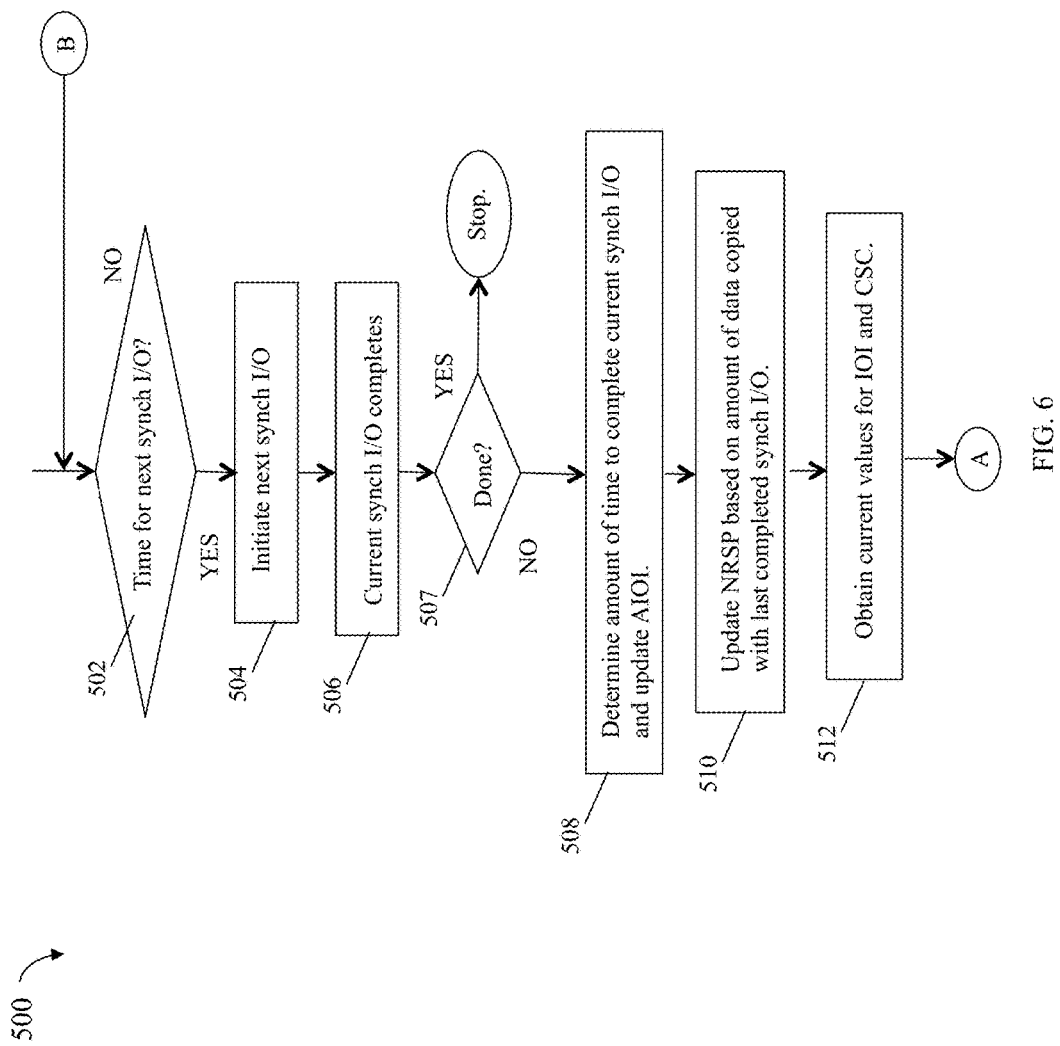
FIGS. 6 and 7 are flowcharts of processing steps that may be performed in an embodiment in accordance with techniques herein.
Figure 7:
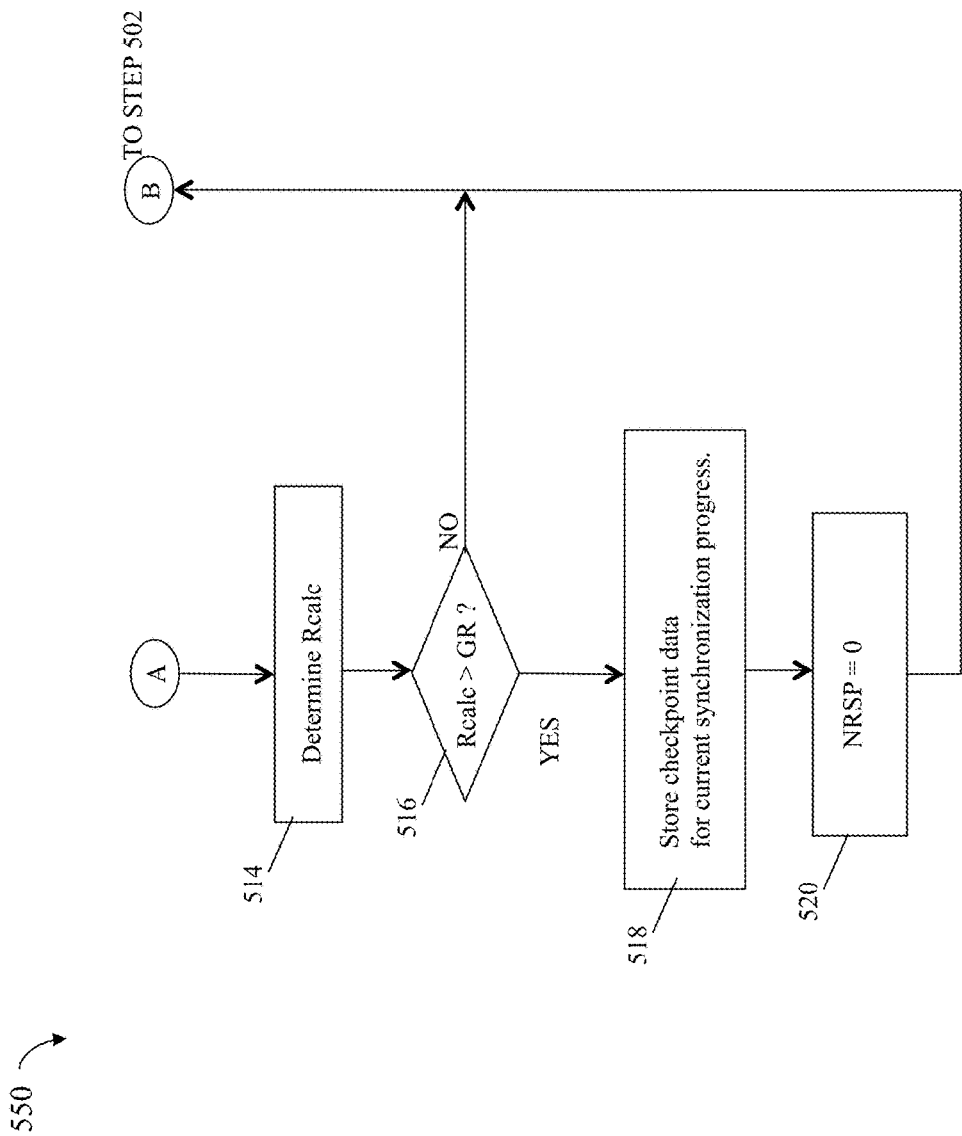

Referring to FIGS. 6 and 7, shown are flowcharts 500 and 550 of processing steps that may be performed in an embodiment in accordance with techniques herein. FIGS. 6 and 7 summarize processing described above.

At step 502, a determination is made as to whether it is time to initiate the next synchronization I/O. As described above, the rate or time at which synchronization I/Os are issued may be based on the current IOI setting. Control remains at step 502 until step 502 evaluates to yes where control then proceeds to step 504. At step 504, the next synchronization I/O is initiated. At step 506, the synchronization I/O issued at step 504 completes. At step 507, a determination is made as to whether synchronization or copying of source LUN data to its clone is completed (e.g., data from all source LUN LBAs has been copied to the clone). If step 507 evaluates to yes, processing stops. If step 507 evaluates to no, control proceeds to step 508.

At step 508, processing is performed to determine the amount of time it took to complete the synchronization I/O that completed in step 506. This may be measured, for example, as the amount of time that has elapsed between step 504 and 506. Also in step 508, processing may be performed to update AIOI that represents the average amount of time it takes for a synchronization I/O to complete. At step 510, NRSP is updated based on the amount of data copied by the last completed synchronization I/O. At step 512, current values for IOI and CSC may be obtained since these values may change dynamically in a system. At step 514, Rcalc is determined such as using EQUATION 1. At step 516, a determination is made as to whether Rcalc is greater than GR. If step 514 evaluates to no, control proceeds to step 502. If step 514 evaluates to yes, control proceeds to step 518 where processing is performed to record updated checkpoint data for the current synchronization progress. At step 520, NRSP is initialized to 0 and control then proceeds to step 502.

In at least one implementation not using techniques herein, the checkpoint data may be updated at fixed copying intervals such as every time N blocks are copied, such as every time 128 MB are copied from the source LUN to its clone. In one aspect, NRSP in such an implementation not using techniques herein, NRSP may be a fixed value of 128 MB.

Figure 8:
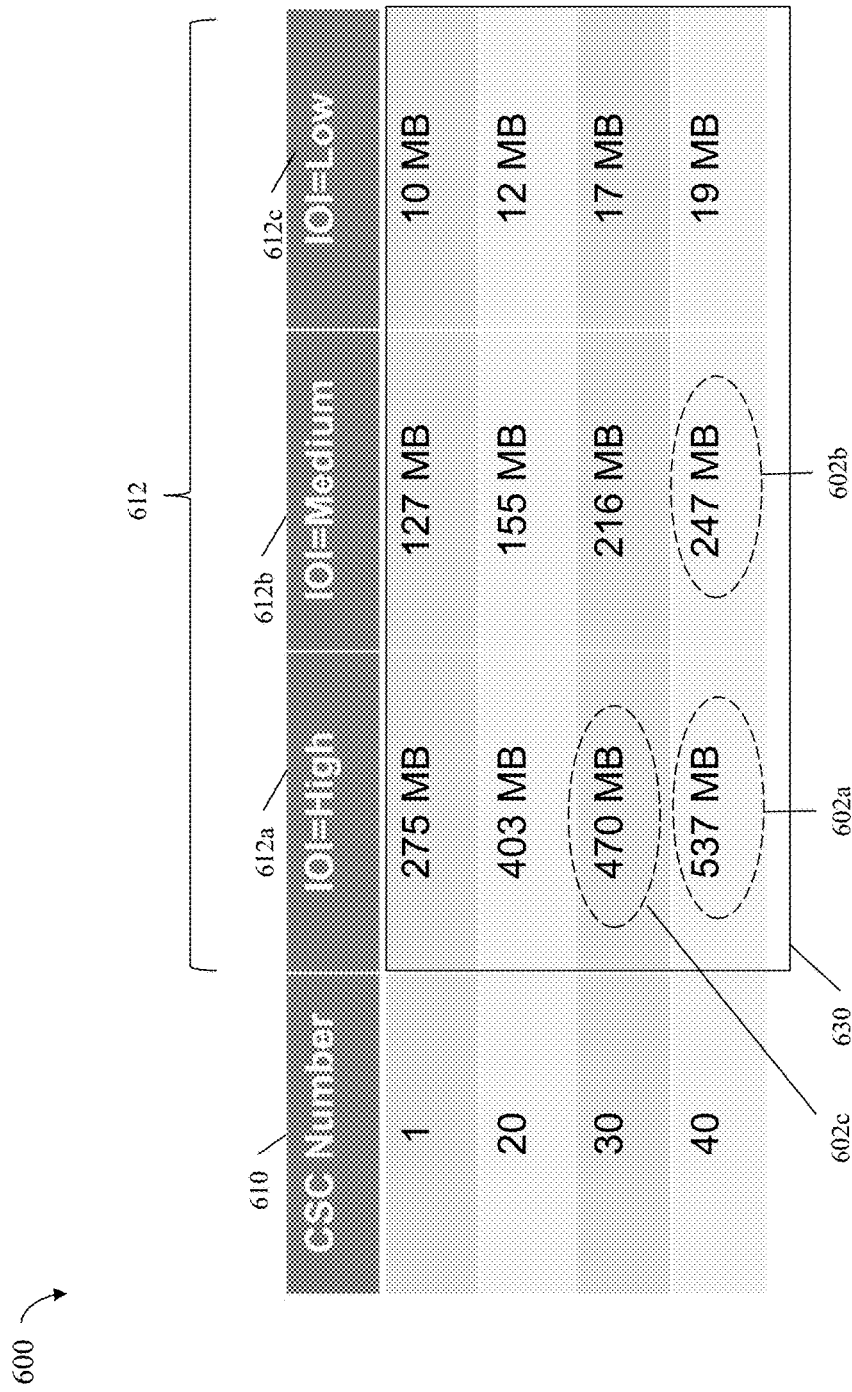
FIG. 8 is an example of different values for combinations of factors and associated non-recorded synchronization progress thresholds in an embodiment in accordance with techniques herein.

In contrast, consider an embodiment in accordance with techniques herein using EQUATION 1 where MXCSC is 40, GR is 0.618 and AIOI is 0.002 seconds. Assume further that the factors IOI and CSC may be dynamically changing. Given the foregoing, reference is now made to FIG. 8 illustrating a chart of NRSP threshold values.

The example 600 includes a table with a first column CSC number 610, second column IOI=high 612a, third column IOI=medium 612b, and fourth column IOI=low 612c. Columns 612a-c represent different possible IOI settings or selections as may be made through a GUI as described above. The different values in column 610 denote the different possible values for CSC. Element 630 is a matrix of NRSP threshold values based on EQUATION 1 with a first set of conditions where MXCSC is 40, GR is 0.618 and AIOI is 0.002 seconds.

Given the first set of conditions, each entry or cell of the matrix 630 is an NRSP threshold having a corresponding IOI value and CSC value based, respectively, on the particular column and row information for that cell. Thus, the particular column and row information identify values for IOI and CSC as used with the first set of conditions in EQUATION 1 to determine the indicated NRSP threshold. Elements 602a and 602b identify the NRSP thresholds, respectively, of EXAMPLE 2 and EXAMPLE 1 described in preceding paragraphs.

For example, using EQUATION 1, Rcalc may be determined where MXCSC is 40, GR is 0.618 and AIOI is 0.002 seconds and additionally where CSC=40 and IOI=high=0.0003 seconds. Based on the foregoing, 602a indicates the NRSP threshold of 537 MB that must be exceeded in order for recorded checkpoint data to be updated.

As another example, using EQUATION 1, Rcalc may be determined where MXCSC is 40, GR is 0.618 and AIOI is 0.002 seconds and additionally where CSC=30 and IOI=high=0.0003 seconds. Based on the foregoing, 602c indicates the NRSP threshold of 470 MB that must be exceeded in order for recorded checkpoint data to be updated.

What will now be described and illustrated are exemplary results that may be obtained in connection with an embodiment in accordance with techniques herein as compared to an alternative implementation as noted above which records updated checkpoint data every time 128 MB are copied from the source LUN to its clone. The exemplary results assume an embodiment in accordance with techniques herein in which EQUATION 1 is used as described above with MXCSC=40, GR=0.618 and AIOI=0.002 seconds while varying the IOI and CSC values.

Figure 9:
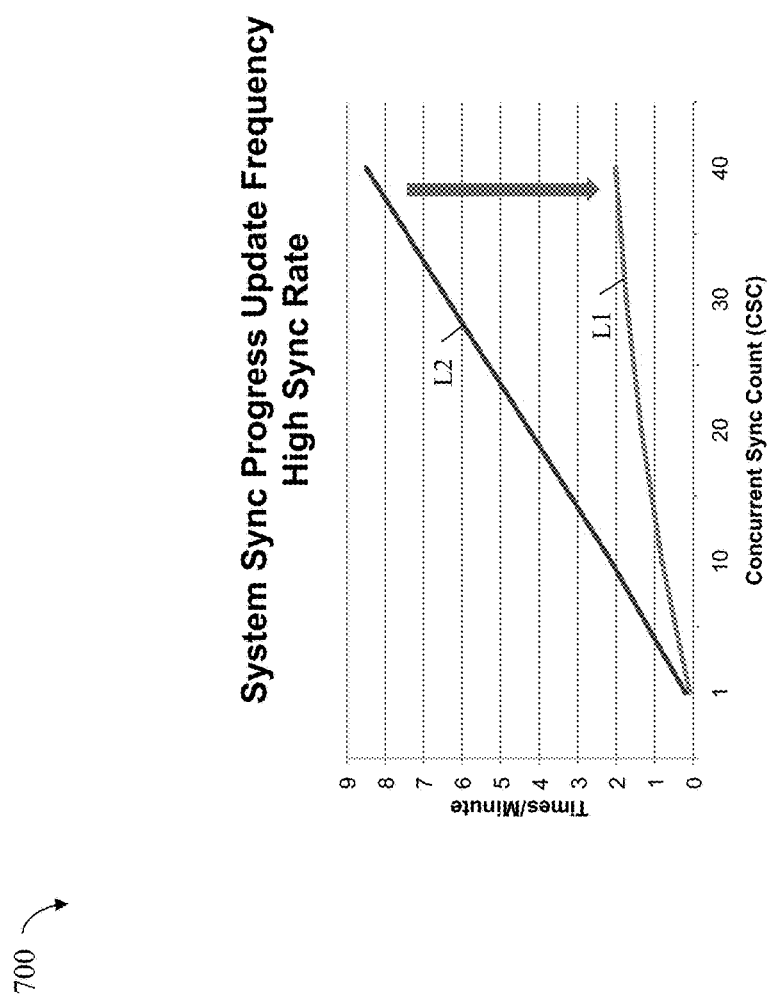
FIGS. 9-11 graphically illustrate results for different IOIs and CSC in an embodiment in accordance with techniques herein in comparison to an implementation not using techniques herein.

Referring to FIG. 9, shown is an example 700 graphically illustrating results of techniques herein as compared to the implementation not using techniques herein as noted above when the IOI is set at HIGH. The example 700 includes an X axis with different CSC values and a Y axis with different checkpoint update frequencies (e.g., synchronization progress update frequency) denoting a number of times per minute checkpoint data is updated. Line L2 illustrates the different checkpoint update frequencies for different CSC values using techniques described herein. Line L1 illustrates the different checkpoint update frequencies for different CSC values in the implementation not using techniques described herein which records updated checkpoint data every time 128 MB are copied from the source LUN to its clone. As can be seen by visual comparison of L1 and L2, the synchronization progress update frequency on the Y axis for L1 is decreased using techniques herein as the value of CSC increases since the workload and resources consumed by the system increase as CSC increases. With L1, as CSC increases, the synchronization progress update frequency also increases but at a slower rate than with L2. This is because techniques herein consider the additional system workload and resources consumed as CSC increases.

Figure 10:
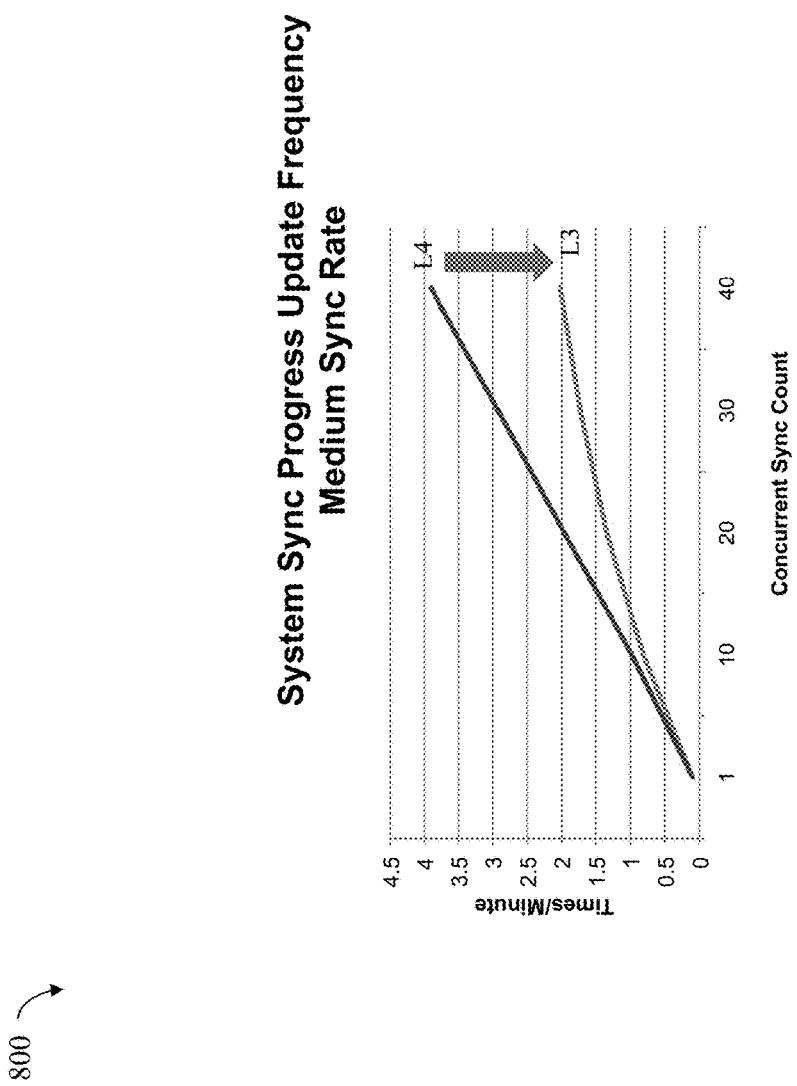

Referring to FIG. 10, shown is an example 800 graphically illustrating results of techniques herein as compared to the implementation not using techniques herein as noted above when the IOI is set at MEDIUM. The example 800 has X and Y axis as described in connection with FIG. 9. Line L3 illustrates the different checkpoint update frequencies for different CSC values using techniques described herein. Line L4 illustrates the different checkpoint update frequencies for different CSC values in the implementation not using techniques described herein which records updated checkpoint data every time 128 MB are copied from the source LUN to its clone. As can be seen by visual comparison between L3 and L4, techniques herein provide for decreasing the checkpoint update frequency. However, note that the difference between L3 and L4 is less in comparison to the difference between L1 and L2 due to the reduced IOI in the example 800 due to the lower IOI in the example 800.

Figure 11:
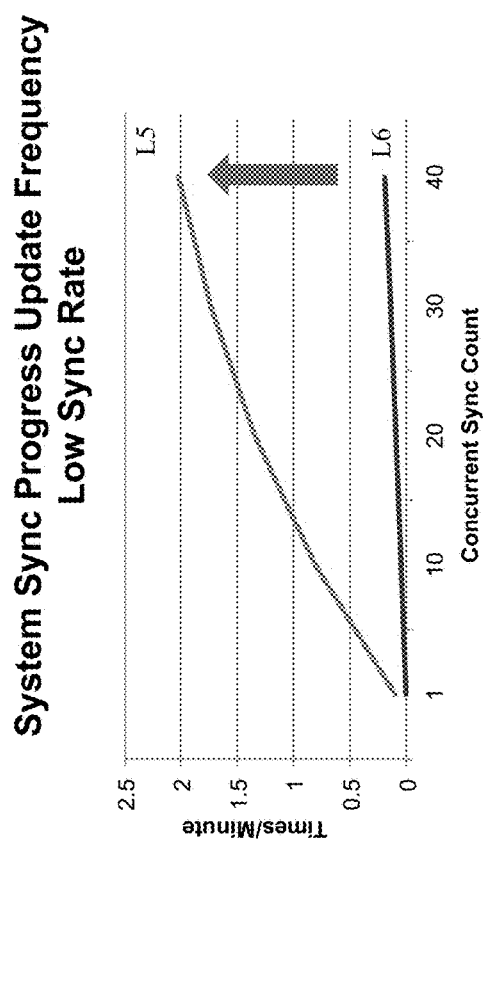

Referring to FIG. 11, shown is an example 900 graphically illustrating results of techniques herein as compared to the implementation not using techniques herein as noted above when the IOI is set at LOW. The example 900 has X and Y axis as described in connection with FIG. 9. Line L5 illustrates the different checkpoint update frequencies for different CSC values using techniques described herein. Line L6 illustrates the different checkpoint update frequencies for different CSC values in the implementation not using techniques described herein which records updated checkpoint data every time 128 MB are copied from the source LUN to its clone. As can be seen by visual comparison between L5 and L6, with a LOW IOI, techniques herein (L5) provide for increasing the checkpoint update frequency in comparison to the implementation not using techniques herein (L6). In the example 900 with the LOW IOI, the system load is reduced and techniques herein provide for updating the synchronization progress more frequently that in the implementation not using techniques herein since more system resources are available/system is not as busy in comparison to FIGS. 9 and 10 with higher IOI values.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of updating checkpoint data during a copy process that copies data from a first device to a second device, the method comprising:
    copying, using at least one processor, a portion of data from the first device to the second device;
    determining, using at least one processor, a first calculated value in accordance with a plurality of factors;
    determining, using at least one processor and in accordance with the first calculated value and a threshold ratio, whether to update the checkpoint data denoting progress of the copy process that copies data from the first device to the second device;
    if it is determined to update the checkpoint data, performing first processing, using at least one processor, that updates the checkpoint data stored on persistent memory;
    responsive to an event occurrence at a first point in time prior to completely copying data from the first device to the second device, stopping the copy process whereby copying of data from the first device to the second device stops, wherein the checkpoint data stored on the persistent memory at the first point in time identifies a first location on the first device denoting that data of the first device up to the first location has been copied to the second device at the first point in time; and
    resuming, at a second point in time subsequent to the first point in time, the copy process that copies data from the first device to the second device, wherein said resuming uses the checkpoint data and resumes copying data from the first location of the first device as identified by the checkpoint data.

2. The method of claim 1, wherein the plurality of factors includes non-recorded synchronization progress indicating an amount of data that has been copied from the first device to the second device since checkpoint data was last recorded.

3. The method of claim 1, wherein the plurality of factors includes an average amount of time delay between consecutive synchronization I/O operations performed each of which copy a different data portion of the first device to the second device.

4. The method of claim 3, wherein the average amount of time delay between consecutive synchronization I/O operations is configured and denotes an average rate at which processing is performed to copy data from the first device to the second device thereby affecting the rate at which synchronization I/Os are issued to copy data from the first device to the second device.

5. The method of claim 4, wherein the average amount of time delay is configured via a user input from a user interface.

6. The method of claim 1, wherein the plurality of factors includes an average measured amount of time to complete a single synchronization I/O operation that copies a portion of data from the first device to the second device.

7. The method of claim 1, wherein the plurality of factors includes a number of concurrent data synchronizations currently being performed.

8. The method of claim 1, wherein said determining, in accordance with the first calculated value and a threshold ratio, whether to update checkpoint data denoting progress of copying data from the first device to the second device, includes:
    comparing the first calculated value to the threshold ratio; and determining, responsive to said comparing, whether the first calculated value exceeds the threshold ratio.

9. The method of claim 8, wherein it is determined to update the checkpoint data and perform said first processing responsive to determining that the first calculated value exceeds the threshold ratio.

10. The method of claim 1, wherein the first processing includes recording information in persistent memory, said information denoting a location on the first device whereby all data of the first device data up to the location has been copied to the second device.

11. The method of claim 10, wherein the method includes copying a plurality of data portions of the first device to the second device, wherein the plurality of data portions are stored at logical addresses of the first device that are sequentially ordered, and wherein the plurality of data portions are copied sequentially in accordance with the sequential ordering of the logical addresses.

12. The method of claim 1, wherein the first device and the second device are logical devices.

13. The method of claim 1, wherein the first device is an original set of data and the second device is a clone of the first device, the method being performed to synchronize the second device with the first device.

14. The method of claim 1, wherein the second device is an original set of data and the first device is a clone of the first device, the method being performed to resynchronize the second device with the first device.

15. The method of claim 1, wherein the plurality of factors includes non-recorded synchronization progress indicating an amount of data that has been copied from the first device to the second device since checkpoint data was last recorded, an average amount of time delay between consecutive synchronization I/O operations performed each of which copy a different data portion of the first device to the second device, an average measured amount of time to complete a single synchronization I/O operation that copies a portion of data from the first device to the second device, and a number of concurrent data synchronizations currently being performed.

16. A method of updating checkpoint data during a copy process that copies data from a first device to a second device, the method comprising:
    copying, using at least one processor, a portion of data from the first device to the second device;
    determining, using at least one processor, a first calculated value in accordance with a plurality of factors;
    determining, using at least one processor and in accordance with the first calculated value and a threshold ratio, whether to update the checkpoint data denoting progress of the copy process that copies data from the first device to the second device; and
    if it is determined to update the checkpoint data, performing first processing using at least one processor that updates the checkpoint data, wherein the plurality of factors includes non-recorded synchronization progress indicating an amount of data that has been copied from the first device to the second device since checkpoint data was last recorded, an average amount of time delay between consecutive synchronization I/O operations performed each of which copy a different data portion of the first device to the second device, an average measured amount of time to complete a single synchronization I/O operation that copies a portion of data from the first device to the second device, and a number of concurrent data synchronizations currently being performed, and wherein the first calculated value, Rcalc, is expressed as:

$$Rcalc = \frac{NRSP}{\left(\frac{1}{IOI + AIOR}\right) * \left(1 + \frac{CSC}{MXCSC}\right)}$$

where
  NRSP is said non-recorded synchronization progress;
  IOI is said average amount of time delay between consecutive synchronization I/O operations;
  AIOR is said average measured amount of time to complete a single synchronization I/O operation;
  CSC is said number of concurrent data synchronizations currently being performed; and
  MXCSC is an integer constant denoting a maximum number of allowable concurrent synchronization.

17. The method of claim 16, wherein the method includes:
    comparing the first calculated value to the threshold ratio; and
    determining, responsive to said comparing, whether the first calculated value exceeds the threshold ratio.

18. A non-transitory computer readable medium comprising code stored thereon that, when executed by at least one processor, performs a method of updating checkpoint data during a copy process that copies data from a first device to a second device, the method comprising:
    copying, using at least one processor, a portion of data from the first device to the second device;
    determining, using at least one processor, a first calculated value in accordance with a plurality of factors;
    determining, using at least one processor and in accordance with the first calculated value and a threshold ratio, whether to update the checkpoint data denoting progress of the copy process that copies data from the first device to the second device;
    if it is determined to update the checkpoint data, performing first processing, using at least one processor, that updates the checkpoint data stored on persistent memory;
    responsive to an event occurrence at a first point in time prior to completely copying data from the first device to the second device, stopping the copy process whereby copying of data from the first device to the second device stops, wherein the checkpoint data stored on the persistent memory at the first point in time identifies a first location on the first device denoting that data of the first device up to the first location has been copied to the second device at the first point in time; and
    resuming, at a second point in time subsequent to the first point in time, the copy process that copies data from the first device to the second device, wherein said resuming uses the checkpoint data and resumes copying data from the first location of the first device as identified by the checkpoint data.

19. A system comprising:
    at least one processor; and
    a memory comprising code stored thereon that, when executed by the at least one processor, performs a method of copying data from a first device to a second device comprising:
        copying, using at least one processor, a portion of data from the first device to the second device;

determining, using at least one processor, a first calculated value in accordance with a plurality of factors;

determining, using at least one processor and in accordance with the first calculated value and a threshold ratio, whether to update the checkpoint data denoting progress of the copy process that copies data from the first device to the second device;

if it is determined to update the checkpoint data, performing first processing, using at least one processor, that updates the checkpoint data stored on persistent memory;

responsive to an event occurrence at a first point in time prior to completely copying data from the first device to the second device, stopping the copy process whereby copying of data from the first device to the second device stops, wherein the checkpoint data stored on the persistent memory at the first point in time identifies a first location on the first device denoting that data of the first device up to the first location has been copied to the second device at the first point in time; and resuming, at a second point in time subsequent to the first point in time, the copy process that copies data from the first device to the second device, wherein said resuming uses the checkpoint data and resumes copying data from the first location of the first device as identified by the checkpoint data.

\* \* \* \* \*